(12) United States Patent
Kang et al.

(10) Patent No.: US 6,319,966 B1
(45) Date of Patent: Nov. 20, 2001

(54) POLYMETHYLMETHACRYLATE RESIN WITH AN IMPACT MODIFIER CAPSULATED THEREIN AND A PROCESS OF PREPARING FOR THE SAME

(75) Inventors: Chung Suk Kang, Seoul; Sung Mo Park, Suwon; Kap Sung Lee, Seoul, all of (KR)

(73) Assignee: Kolon Industries, Inc., Kyunggi-do (KR)

( * ) Notice: Subject to any disclaimer, the term of this patent is extended or adjusted under 35 U.S.C. 154(b) by 0 days.

(21) Appl. No.: 09/486,590

(22) PCT Filed: May 14, 1999

(86) PCT No.: PCT/KR99/00241

§ 371 Date: Jun. 10, 2000

§ 102(e) Date: Jun. 1, 2000

(87) PCT Pub. No.: WO99/60061

PCT Pub. Date: Nov. 25, 1999

(30) Foreign Application Priority Data

May 19, 1998 (KR) .................................................. 98-17896

(51) Int. Cl.[7] ..................................................... C08L 83/00
(52) U.S. Cl. ................................ 523/201; 525/64; 525/71
(58) Field of Search .............................. 523/201; 525/64, 525/71

(56) References Cited

U.S. PATENT DOCUMENTS

| | | | |
|---|---|---|---|
| 4,801,646 | * | 1/1989 | Henton .................................. 525/71 |
| 5,438,099 | | 8/1995 | Fischer et al. . |
| 5,475,053 | * | 12/1995 | Niessner .................................. 525/64 |

FOREIGN PATENT DOCUMENTS

| | | |
|---|---|---|
| A230999 | 7/1981 | (EP) . |
| A1592953 | 4/1994 | (EP) . |

* cited by examiner

*Primary Examiner*—Paul R. Michl
(74) *Attorney, Agent, or Firm*—Birch, Stewart, Kolasch & Birch, LLP

(57) ABSTRACT

A PMMA resin containing an impact modifier capsulated therein, said impact modifier comprising a core of a glass polymer, an intermediate layer of a rubber copolymer grafted to the core and an outer layer of a glass polymer grafted to the intermediate layer, the impact modified PMMA resin having a granular shape, the amount of the core being 5 to 20 weight %, the amount of the intermediate layer being 10 to 70 weight % and the amount of the outer layer being 25 to 85 weight %, the intermediate of the rubber copolymer being a copolymer of at least one monomer selected from the group consisting of butylacrylate and butadiene and a monomer of styrene, the outer layer of a glass polymer containing a chain transfer agent.

14 Claims, No Drawings

POLYMETHYLMETHACRYLATE RESIN WITH AN IMPACT MODIFIER CAPSULATED THEREIN AND A PROCESS OF PREPARING FOR THE SAME

This application is the national phase under 35 U.S.C. §371 of PCT International Application No. PCT/KR99/00241 which has an International filing date of May 14, 1999, which designated the United States of America.

TECHNICAL FIELD

The present invention relates to a polymethylmethacrylate (herein after referred to as "PMMA") resin with an impact modifier capsulated therein which possesses good transparency and high impact resistance, and to a process of preparing the same without steps for the separate addition of a PMMA resin and impact modifier to an extruder in order to improve productivity.

The present invention intends to improve the conventional impact modifier having a core-shell structure produced by two or three emulsion polymerization steps, which includes problems that the thickness of the shell layer is increased thereby degrading the impact resistance.

Also the present invention provides a process for producing a PMMA resin with an impact modifier capsulated therein having improved reinforcing properties and processibility by increasing the thickness of the shell layer without degradation of the impact resistance and having improved properties of transparency together with impact resistance by dispersing the impact reinforcement agent uniformly in the products.

DESCRIPTION OF THE RELATED ART

Typically, a PMMA resin has been compounded with an impact modifier in the production of PMMA resin products for improving impact strength and other properties. An impact modifier for the transparent acryl resin includes a methylmethacrylate-butadiene-styrene group (hereinafter referred to as "MBS group"), an acrylonitrile-butadiene-styrene group (hereinafter referred to as "ABS group") and an acrylate group impact modifier. Particularly, the impact modifier of the MBS and ABS groups show poor physical properties due to their low weather resistance when used in the open air for a long period, and the producing process is complicated by the use of a butadiene gas. The transparency of the impact modified PMMA is lowered because of the different refractive index of the components. Furthermore, the impact modifier of the ABS group must be used more than other kinds of the impact modifiers to obtain the same reinforcing effect.

Impact modifiers having excellent resistance against the weather and good impact strength and may include, for example, an acrylic impact modifier which is prepared from (meta)acrylic monomers, vinyl monomers such as styrene derivatives and vinyl derivatives, surfactant, initiator, crosslinking agent, and grafting agent.

The acrylic impact modifier has improved impact strength because the impact is transferred to the acrylic rubber layer from the outer matrix resin and its energy is absorbed and diverted.

Furthermore, the acrylic impact modifier has advantages in that it may be produced without degradation of the transparency by designing the rubber and matrix layers so that the refractive indexes are equal. However, when the outer stress is applied to the product, the color around the stressed portion changes to white.

To prevent such problem, the Japanese Patent Publications 1980-148729, 1971-31462 and 1979-1584 proposes the process including the stages of emulsion polymerization for making the impact modifier have a core-shell structure and finally polymerizing a hard polymer having good mixing ability with the matrix resin to the outer layer. However, such process includes problems in that the amount of impact modifier should be increased because of less content of rubber therein and the thickness of the outer layer is limited because the impact strength is more weaken when the outer layer thickness is increased.

The Japanese Patent Publication 1981-96862 discloses the process using graft copolymers having an increased content of rubber component by highly crosslinking the rubber polymer. However, such a highly crosslinked polymer has a degraded impact absorbing effect due to its decreased rubber resilience and a degraded mixing property with the matrix thereby decreasing the processibility of the product.

Furthermore, when forming the impact modified PMMA sheet by using the above mentioned impact modifier according to the prior arts, many problems have arisen in that the process is complicated and productivity is decreased because the PMMA and impact modifier should be made by separate processes and be supplied to an extruders, separately.

The formed sheet product has a degraded transparency because the impact modifier is not uniformly dispersed therein. Therefore, the thickness of the sheet product is limited in obtaining the necessary transparency.

SUMMARY OF THE INVENTION

It is an object of the present invention to provide a PMMA resin with an impact modifier capsulated therein having good transparency and good impact resistance properties.

It is another object of the present invention to provide a process for manufacturing a PMMA resin with an impact modifier capsulated therein which has advantages that the process using in producing the product is simplified and the productivity is increased.

To achieve the above objects, the present invention provides a PMMA resin with an impact modifier capsulated therein which comprises a core of a glass polymer, an intermediate layer of a rubber copolymer grafted to the core and an outer layer of a glass polymer grafted to the intermediate layer. The products have a granular shape, with the amount of the core being between 5 to 20 weight %, the amount of the intermediate layer being between 10 to 70 weight % and the outer layer being 25 to 85 weight %, the intermediate of the rubber copolymer being a copolymer of at least one monomer selected from butylacrylate or butadiene and at least one monomer selected from styrene or styrene derivative, the outer layer of the glass polymer containing a chain transfer agent.

The PMMA resin with the impact modifier capsulated therein according to the present invention has in three layer structure an impact modifier of a glass polymer core and an intermediate layer of a rubber copolymer grafted to the core and an outer layer of a glass polymer(as a matrix resin) grafted to the intermediate.

Preferably, in the PMMA resin with the impact modifier capsulated therein according to the present invention, the weight % or average diameter of the outer layer is higher or larger than that of the core. As the result, when preparing transparent sheet or molding a products, there is no need to use the matrix PMMA resin thereby simplifying the molding process and increasing the productivity.

The PMMA resin with the impact modifier capsulated therein according to the present invention is characterized by including a chain transfer agent in the outer layer. The chain transfer agent acts to adjust the molecular weight and melt viscosity of the outer layer without decreasing an impact resistance thereof.

Furthermore, the PMMA resin with the impact modifier capsulated therein according to the present invention is characterized in that the intermediate layer of a rubber polymer is composed of the copolymer of at least one monomer selected from butylacrylate or butadiene and at least one monomer selected from the styrene or styrene derivatives.

According to the present invention, a process for producing a PMMA resin with the impact modifier capsulated therein which includes three emulsion polymerizing stages as following:

First emulsion polymerizing stage for preparing emulsion of a glass polymer for a core with the conversion rate of 93 to 99%, which has an average diameter of 30 to 200 nm, by inputting the composition solution of a part of the first monomers, deionized water, emulsifier, grafting agent, and crosslinker under the nitrogen atmosphere into a reactor, heating and agitating the composition solution, emulsion-polymerizing the composition by dropping a polymerization initiator when the temperature of the composition reaches 50 to 90° C., continuously polymerizing the composition dropping the remaining first monomers when seed emulsions are formed, and finally inputting the initiator into the composition at the end of the polymerization;

Secondary emulsion-polymerizing stage for producing the polymer emulsion grafted to the glass polymer core with the conversion rate of 93–99% and the average.thickness of 10 to 150 nm, by agitating the emulsion at the temperature of 50 to 90° C. dropping an emulsifier, initiator, a crosslinker, the second monomers of at least one of butylacrylate or butadiene and at least one of styrene or styrene derivatives, and inputting the additional initiator at the end of the polymerization;

Third emulsion-polymerization stage for producing a PMMA resin with an impact modifier capsulated therein with the conversion rate of more than 93%, in which an glass polymer (outer layer) is grafted to the rubber polymer (intermediate layer) with the thickness of 60 to 3000 nm, by continuously polymerizing dropping the third monomers and polymerization initiator and inputting a chain transfer agent and polymerization initiator at the end of the polymerization.

DETAILED DESCRIPTION OF PREFERRED EMBODIMENTS

At first, the process for emulsion-polymerization the first monomer is disclosed in detail below.

The composition solution of a part of the first monomers, deionized water, emulsifier, grafting agent, and crosslinker is inputted into a reactor under the nitrogen environment, the composition solution is heated and agitated. When the temperature of the composition reaches 50 to 90° C., the composition is emulsion-polymerized adding a polymerization initiator thereto. Finally, the polymerization initiator is added to the composition at the end of the polymerizing stage. Thus, the emulsion of a glass polymer for a core is obtained.

In the first emulsion polymerizing stage, the average diameter of the emulsion of a glass polymer for a core is dependent on the amount of the used emulsifier and the first monomer. Less amount of the first monomer makes the size of the glass polymer to be decreased thereby forming more rubber polymer in the impact modifier. The first monomer is preferably used in the amount of 5 to 20 weight part to the total amount of the used monomers. Furthermore, it is preferred to control the average diameter in the range between 30 and 200 nm by controlling the amount of the emulsifier.

It is also preferred to emulsion-polymerize the first monomer so that the ratio of converting the first monomer to the glass polymer is 93–99%. If the conversion ratio is less than 93%, the thermal stability is lowered thereby causing its decomposition in the processing.

The first monomer used in the first stage may be at least one monomer selected from the group of the aromatic vinyl-monomer, (meta)acrylic alkylester having 1~20 carbon atoms, (meta)acrylalkyl arylester having 1~20 carbon atoms and (meta)acrylic fluoralkylester having 1~20 carbon atoms.

The deionized water is obtained from the ion exchanger and having the electric resistance of over 1 MΩ under the nitrogen atmosphere. The deionized water is used in the amount of 80 to 800 weight part of the first monomer.

The secondary emulsion-polymerizing stage is described in detail below.

The glass polymer emulsion obtained from the first stage is agitated and polymerized at the temperature of 50 to 90° C. dropping emulsifier, initiator, grafting agent, crosslinker and the secondary monomer and adding the polymerization initiator at the end of the polymerizing. The rubber polymer of the intermediate layer is grafted to the glass polymer of the core by the emulsion-polymerization. The impact resistance is improved with the more rubber polymer in the impact modifier.

In the secondary stage, it is important to use the rubber polymer of 10 to 70 weight part to the total amount of the used monomers. If the rubber polymer less 10 weight part is provided in the impact modifier, the impact resistance is decreased. The average thickness of the crosslinked rubber polymer is between 10 and 150 nm, more preferably between 30 and 80 nm.

It is preferred to emulsion-polymerize the secondary-monomer so that the conversion ratio of the secondary monomer converted into the rubber polymer in the secondary stage is between 93 and 99%. If the conversion ratio is less than 93%, the thermal stability is reduced thereby causing its decomposition in the processing.

In the secondary stage, the monomers may be clustered when the dropping time of the secondary monomer and polymerizing time are not proper or the surfactant is not used.

At least one of butylacrylate or butadiene and at least one of styrene or styrene derivatives are used as the secondary monomer. The styrene derivative substituted with a halogen, or substituted with a alkyl radical or a aryl radical having 1 to 20 carbon atoms.

The third emulsion-polymerizing stage is described in detail below.

The emulsion produced from the secondary emulsion-polymerizing stage is continuously polymerized dropping the third monomer as a matrix component and the polymerization initiator thereto and adding a chain transfer agent and polymerization initiator at the end of the polymerizing so that the glass polymer (outer layer) grafted to the rubber polymer (intermediate layer) is obtained.

In the third emulsion-polymerizing stage, it is important feature of the present invention that the chain transfer agent is added to control the molecular weight. The chain transfer agent may be at least one selected from the group including sulfur compounds such as n-butylmercaptan having 1 to 20 carbon atoms and n-butyl(di) sulfide, amino compounds such as butylamine and triethyl(methyl) amine, halogen compounds such as chloroform and tetrachloro(bromo) methane, alcohol group including ethanol or acetone. The chain transfer agent is preferably used at the ratio of 0.02 to 5.0 weight part to 100 weight part of the third monomer.

It is important that the amount of the third monomer is 25 to 85 weight part to the amount of total monomers. If the third monomer is less than 25 weight part, additional PMMA resin should be used thereby complicating the producing process and decreasing the productivity. The third monomers is at least one selected from group including aromatic vinyl group monomer, (meta)acrylic alkylester having 1~20 carbon atoms, (meta)acrylic alkylarylester having 1~20 carbon atoms and (meta)acrylic fluoralkylester having 1~20 carbon atoms.

It is desirable to control the average thickness of the grafted third monomer 60 to 3000 nm, more preferably 80 to 200 nm. In the third stage is preferred to polymerize the third monomer with the conversion ratio of more than 95%. If the conversion rate is less than 95%, the thermal stability and physical properties are degraded thereby causing its decomposition in the processing.

The emulsifier(surfactant) may comprises the anionic emulsifier of potassium salt, ammonium and sodium of alkylsulfate with 4 to 30 carbon atoms, the reactive emulsifier of the same functional group or amphoteric emulsifier. More particularly, the emulsifier may be the one selected from the sodium dodecylsulfate, sodium dioctyl-sulfosuccinate or sodium dodecylbenzenesulfate. Preferably, the emulsifier is water-soluble material for increasing the stability of the polymer. The 0.2 to 4 weight part of emulsifier is used to the total monomers.

The crosslinker may comprises 1,2-ethanedioldi(meta) acrylate, 1,3-propanedioldi(meta)acrylate, 1,3- or 1,4-butanedioldi(meta)acrylate, divin-ylbenzene, ethyleneglycoldi(meta)acrylate, propyleneglycoldi(meta) acrylate, butyleneglycoldi(meta)acrylate, triethyleneglycoldi(meta)acrylate, polyethyleneglycoldi (meta)acrylate, polypropyleneglycoldi(meta)acrylate, polybutyleneglycoldi(meta)acrylate or allyl(meta)acrylate.

Preferably, the amount of crosslinker used is 0.1 to 15 weight part to the total monomers.

The polymerization initiator may be comprises cumene-hydroperoxid potassium persulfate or sodium persulfate azo group water-soluble initiator.

Preferably, the amount of initiator used is 0.02 to 2.0 weight part to the total monomers.

When the three stages of process is finished, the emulsion having the structure of three layers is obtained.

The granular emulsion is subsequently dropped in the agitated solution of 0.1 to 2 weight % magnesium sulfate or potassium chloride preheated at 50 to 100° C. thereby obtaining granules precipitated in the emulsion.

For obtaining finally the PMMA resin with an impact modifier capsulated therein according the present invention, the precipitated granules are washed several times with the distilled water of about 70° C. and are dried in the oven at 80° C. The precipitated granules can be also dried by a spray drier.

The produced PMMA with an impact modifier capsulated therein comprises a core made of the glass polymer of the first monomer, an intermediate layer of a rubber copolymer grafted to the core and an outer layer of a glass polymer grafted to the intermediate layer, the resin having a granular shape, the acryl resin having in the ratio of the 5 to 20% of the core : 10 to 70 weight % of the intermediate layer : 25 to 85 weight % of the outer layer, and the thickness in the ratio of 30 to 200 nm of the core : 10 to 150 nm of the intermediate layer : 60 to 3000 nm of the outer layer.

Furthermore, the outer layer of the glass polymer contains a chain transfer agent and the intermediate layer is consisted of the copolymer of at least one monomer selected from butylacrylate or butadiene and at least one monomer selected from styrene or styrene derivatives.

The PMMA resin with an impact modifier capsulated therein according to the present invention has the properties of good impact resistance and of good transparency due to its excellent dispersive properties in case of molding the thick sheet. Furthermore, the powdered PMMA resin also has the improved physical properties due to excellent porcessibility.

As the resin of the present invention has a structure that matrix resin is grafted to the glass polymer(core), the stage of compounding the matrix resin and the impact modifier can be omitted. As result the pelletizing process is simplified and the productivity is increased. The PMMA resin with an impact modifier capsulated therein according to the present invention is the one that integrated with the impact modifier and the matrix resin.

According to the present invention, the physical properties are tested as following:

ASTM D-1003 Method for the transparency(%) test; ASTM D-256 Method for the impact strength(kg.cm/cm) test; ASTM D-790 Method for the bending strength(kg/cm$^2$) test; and ASTM D-790 Method for the elastic deformation (kg/cm$^2$) test.

Example 1

The deionized water 700 g is heated at 70° C. in the reactor having the volume of 3 litters under the nitrogen atmosphere and the composition 20 g composed of the methylmethacrylate 85 g, ethylmethacrylate 10 g, allyl-methacrylate 0.45 g and sodium dioctylsulfosuccinate 0.78 g is added and agitated for 15 minutes. The 1% potassiumpersulfate solution 8 ml is further added to the reactor and the composition is agitated for 60 minutes. The residual composition is dropped at the rate of 5 g/minute into the reactor when the polymerization process is almost completed. After the dropping step, the polymerization is further performed to obtain the glass polymer as the core having the average diameter 180 nm, of which the conversion ratio is 94%.

The glass polymer is agitated for 15 minutes adding the 1% potassium persulfate solution 13 ml and the composition solution composed of butylacrylate 142 g, styrene 23.3 g, allylmethacrylate 1.6 g and sodium dioctylsulfosuccinate 1.3 g is dropped into the reactor at the rate of 8 g/minute. After the dropping step, the composition is polymerized for 240 minutes and further polymerized for 15 minutes adding the potassiumpersulfate solution 6 ml to obtain the emulsion that the crosslinked rubber polymer is grafted to the core with the 96% of conversion ratio. The average thickness of the intermediate layer is about 80 nm.

The obtained granular emulsion is further polymerized in the reactor for 100 minutes dropping the solution of the methylmethacrylate 333 g and ethylacrylate 17.0 g at the rate of 3 g/minutes. The potassiumpersulfate solution 8 ml and chloroform 7 g as the chain transfer agent are further added thereto when the polymerization process is almost completed, and the polymerization is finished to obtain the emulsion that the glass polymer as an outer layer is grafted to the intermediate layer. The average thickness of the grafted outer layer is about 100 nm.

The obtained emulsion is agitated with dropping the 1% magnesiumsulfate solution preheated at 80° C. to obtain the precipitates. The precipitate is washed three times with the distilled water of 70° C., and dried in the vacuum oven at 60° C. for 2 days to obtain the PMMA resin with an impact modifier capsulated therein. The impact modified PMMA resin has the ratio by weight of the core, intermediate layer and outer layer of 96:160:350.

The mixture of the PMMA resin with an impact modifier capsulated therein 4000 g and the additives of Tinuvin-312 8 g, Irganox B-900 4g, Uvitex OB 0.04 g and Blue-pigment 0.008 g is extruded to form the impact test specimens with the thickness of 4 mm for test of physical properties as shown in Table 2.

Example 2 and Comparative Examples 1 and 2

The PMMA resin with an impact modifier capsulated therein and test specimens are prepared by the same process and conditions as the Example 1 except that the ratio of the thickness and weight of the core, intermediate layer and outer layer in the three stages and the amount of the chain transfer agent added in the emulsion polymerization are changed as in Table 1.

Comparative Example 3

The deionized water 700 g is heated at 70° C. in the reactor having the volume of 3 L under the nitrogen atmosphere and the composition solution 40 g composed of the methylmethacrylate 190 g, ethylmethacrylate 20 g, allylmethacrylate 0.9 g and sodium dioctylsulfosuccinate 1.45 g is added and agitated for 15 minutes. The 1% potassiumpersulfate solution 15 ml is further added to the reactor and the composition is agitated for 60 minutes. After the dropping step, the polymerization is further performed to obtain the glass polymer as the core having the average diameter 180 nm, of which the conversion ratio is 94%.

After the 1% potassiumpersulfate solution 25 ml is further added to the reactor and is agitated for 15 minutes, the composition solution of the butylacrylate 284 g, styrene 40 g, allylmethacrylate 6.5 g and sodium dioctylsulfosuccinate 2.5 g is added at the rate of 8 g/minute into the reactor. The emulsion polymerization is further proceeded for 240 minutes and the emulsion is agitated for 15 minutes adding the 1% potassiumpersulfate solution 12 ml to obtain the emulsion that the rubber polymer is grafted to the core with the 96% of conversion ratio. The average thickness of the intermediate layer is about 70 nm.

The above emulsion is further polymerized for 100 minutes dropping the composition solution at the rate of 3 g/minute which is composed of methylmethacrylate 86 g and ethylacrylate 4.5 g to obtain the granule emulsion that the glass polymer as an outer layer is grafted to the intermediate layer. The average thickness of the grafted outer layer is about 48 nm.

The obtained emulsion is agitated with dropping the 1% magnesiumsulfate solution preheated at 80° C. to obtain the precipitate. The emulsion powder is washed three times with the distilled water of 70° C. and dried in the vacuum oven at 60° C. for 2 days to obtain the PMMA resin with an impact modifier capsulated therein.

The mixture of the PMMA resin 3090 g with an impact modifier 908 g and the additives of Tinuvin-312 8 g, Irganox B-900 4 g, Uvitex OB 0.04 g is extruded to form the impact test specimens with the thickness of 4 mm for test of physical properties as shown in Table 2.

TABLE 1

Emulsion Polymerization Conditions

| | Core:Intermediate layer:Outer layer | | Amount of Added Chain transfer agent(Chloroform) |
|---|---|---|---|
| | Weight | Thickness | |
| Example 1 | 16:26:58 | 180:80:100 | 7 |
| Example 2 | 10:24:66 | 180:120:500 | 8 |
| Comparative Example 1 | 3:77:20 | 60:200:40 | 7 |
| Comparative Example 2 | 45:18:37 | 270:8:620 | 8 |
| Comparative Example 3 | 33:53:14 | 180:70:48 | 0 |

TABLE 2

Results of Pysical Properties Test

| | Impact strength (kg · cm/cm) | Bending strength (kg/cm$^2$) | Elastic deformation (kg/cm$^2$) | Transparency (%) | Productivity (cost down. %) |
|---|---|---|---|---|---|
| Example 1 | 6.5 | 750 | 19000 | 92 | 15 |
| Example 2 | 5.8 | 820 | 20000 | 91 | 13 |
| Comparative Example 1 | 6.0 | 900 | 22100 | 88 | 0 |
| Comparative Example 2 | 3.2 | 830 | 18700 | 84 | 0 |
| Comparative Example 3 | 4.5 | 720 | 18500 | 85 | -2 |

The PMMA resin with an impact modifier capsulated therein according to the present invention has the property of good dispersion of the impact modifier in the processing because the much PMMA resin(outer layer) and impact modifier(i.e., core and intermediate layer) are integrated in each particle.

Therefore, the produced resin has the good impact resistance and transparency without degradation of the transparency in case of the thick sheet product.

Since the PMMA resin with an impact modifier capsulated therein according to the invention can be used to produce sheets and other molding articles by a single screw extruder whereby the apparatus is simplified and the productivity is increased compared to a twin screw extruder.

While this invention has been described in connection with what is presently considered to be the most practical and preferred embodiments and examples, it is to understood that the invention is not limited to the disclosed embodiment, but, on the contrary is intended to cover various modifications and equivalent arrangements and methods included within the spirit and scope of the appended claims.

What is claimed is:

1. A PMMA resin containing an impact modifier capsulated therein, said impact modifier comprising a core of a glass polymer, an intermediate layer of a rubber copolymer grafted to the core and an outer layer of a glass polymer grafted to the intermediate layer, the impact modified PMMA resin having a granular shape, the amount of the core being 5 to 20 weight %, the amount of the intermediate layer being 10 to 70 weight % and the amount of the outer layer being 25 to 85 weight %, the intermediate of the rubber copolymer being a copolymer of at least one monomer selected from the group consisting of butylacrylate and butadiene and a monomer of styrene, the outer layer of a glass polymer containing a chain transfer agent.

2. The PMMA resin containing an impact modifier capsulated therein as defined in claim 1, wherein the ratio of the thickness of the core, intermediate layer and outer layer is 100 to 200 nm:10 to 150 nm 60 to 3000 nm.

3. The PMMA resin containing an impact modifier capsulated therein as defined in claim 1, wherein the core and outer layer are the homopolymer or copolymers of at least one monomer selected from the group consisting of an aromatic vinyl monomer, a (meta)acrylic alkylester having 1~20 carbon atoms, a (meta)acrylic alkylarylester having 1~20 carbon atoms and a (meta)acrylic fluoralkylester having 1~20 carbon atoms.

4. The PMMA resin containing an impact modifier capsulated therein as defined in claim 1, wherein chain transfer agent is at least one member selected from the group consisting of sulfur compounds, amino compounds, alcohol and acetone.

5. The PMMA resin containing an impact modifier capsulated therein as defined in claim 1, wherein styrene which is a monomer for the copolymers of the intermediate layer is a compound substituted with a halogen, or substituted with an alkyl radical or an aryl radical having 1–20 carbon atoms, respectively.

6. A process for producing a PMMA resin with an impact modifier capsulated therein which comprises the following three emulsion polymerizing stages:

Conducting a first emulsion polymerizing stage for preparing a granular emulsion of a glass polymer for a core with a conversion ratio of 93–99% and an average diameter of 80–200 nm, by adding the composition of a part of the first monomers, deionized water, an emulsifier, a grafting agent, and a crosslinking agent under a nitrogen atmosphere, into a reactor, heating and agitating the composition, emulsion-polymerizing the composition adding a polymerization initiator thereto when the temperature of the composition reaches 50–90° C., continuously polymerizing the composition while adding the remaining first monomer to form a seed emulsion, and finally inputting the initiator into the composition at the end of the polymerizing step, Conducting a secondary emulsion polymerizing stage for producing the polymer emulsion grafted to the glass polymer granule core a the conversion ratio of 93~99% and an average thickness of 10–150 nm, by agitating the emulsion at a temperature of 50–90° C., adding an emulsifier, a crosslinking agent, and the secondary monomers of at least one of butylacrylate or butadiene and styrene, and inputting the polymerization initiator at the end of the polymerizing;

Conducting a third emulsion polymerizing stage for producing a PMMA resin with an impact modifier capsulated therein with a conversion ratio is of more than 95%, in which a glass polymer (outer layer) is grafted to the rubber polymer (intermediate layer) with the thickness of 60~3000 nm, by continuously polymerizing and adding the third monomers and polymerization initiator, and adding a chain transfer agent and polymerization initiator at the end of the polymerization.

7. The process for producing a PMMA resin with an impact modifier capsulated therein as defined in claim 6, wherein the chain transfer agent is at least one member selected from the group consisting of sulfur compounds, amino compounds, alcohol and acetone.

8. The process for producing a PMMA resin with an impact modifier capsulated therein as defined in claim 6, wherein the ratio of the content of the first monomer, the second monomer and the third monomer is 5 to 20 part:10 to 70 part:25 to 85 part to 100 weight part of the total monomers.

9. The process for producing a PMMA resin with an impact modifier capsulated therein as defined in claim 6, wherein the first and third monomers is at least one monomer selected from the group consisting of an aromatic vinyl monomer, a (meta)acrylic alkylester having 1~20 carbon atoms, a (meta)acrylic alkylarylester having 1~20 carbon atoms and a (meta)acrylic fluoralkylester having 1~20 carbon atoms.

10. The process for producing a PMMA resin with an impact modifier capsulated therein as defined in claim 6, wherein the polymerization initiator is cumenehydroperoxide, potassiumpersulfate or a sodiumpersulfate azo group water-soluble initiator.

11. The process for producing a PMMA resin with an impact modifier capsulated therein as defined in claim 6, wherein the emulsifier is a potassium salt, or an ammonium or sodium of alkylsulfate having 4–30 carbon atoms.

12. The process for producing a PMMA resin with an impact modifier capsulated therein as defined in claim 6, wherein the chain transfer agent content is 0.02 to 4.0 part to 100 parts of the third monomer.

13. The process for producing a PMMA resin with an impact modifier capsulated therein as defined in claim 6, wherein the deionized water has an electric resistance of more than 1 MΩ measured under a nitrogen atmosphere.

14. The process for producing a PMMA resin with an impact modifier capsulated therein as defined in claim 6, wherein the styrene which is a monomer for copolymers of the intermediate layer is a compound substituted with a halogen, or substituted with an alkyl radical or an aryl radical having 1–20 carbon atoms.

* * * * *